(12) United States Patent
Smith

(10) Patent No.: US 9,576,449 B2
(45) Date of Patent: Feb. 21, 2017

(54) DOOR AND WINDOW CONTACT SYSTEMS AND METHODS THAT INCLUDE TIME OF FLIGHT SENSORS

(71) Applicant: Honeywell International Inc., Morristown, NJ (US)

(72) Inventor: Richard Alan Smith, Sunriver, OR (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 0 days.

(21) Appl. No.: 14/729,586

(22) Filed: Jun. 3, 2015

(65) Prior Publication Data

US 2016/0358430 A1 Dec. 8, 2016

(51) Int. Cl.
*G08B 13/08* (2006.01)
*G01S 13/88* (2006.01)

(52) U.S. Cl.
CPC ............ *G08B 13/08* (2013.01); *G01S 13/886* (2013.01)

(58) Field of Classification Search
CPC .............................. G08B 13/08; G08B 13/886
See application file for complete search history.

(56) References Cited

U.S. PATENT DOCUMENTS

| | | | |
|---|---|---|---|
| 5,912,619 A | 6/1999 | Vogt | |
| 9,189,933 B1* | 11/2015 | Stevens | G08B 13/08 |
| 2008/0047350 A1 | 2/2008 | Atlas et al. | |
| 2009/0114801 A1 | 5/2009 | Dipoala et al. | |
| 2015/0080021 A1* | 3/2015 | Bietz | H04B 1/3877 |
| | | | 455/456.1 |
| 2015/0243115 A1* | 8/2015 | Kagerer | E05F 15/43 |
| | | | 340/5.71 |

OTHER PUBLICATIONS

Extended European search report for corresponding EP patent application 16169811.3, dated Aug. 31, 2016.

* cited by examiner

*Primary Examiner* — Leon Flores
(74) *Attorney, Agent, or Firm* — Husch Blackwell LLP

(57) ABSTRACT

Systems and methods that address the gap, security, and robustness limitations of known door and window contact systems and methods without increasing the overall cost thereof are provided. A system can include a time of flight sensor for mounting in or on a first portion of a window unit or a door unit and a microcontroller unit in communication with the time of flight sensor. The sensor can measure a time for a signal to travel from the sensor to a second portion of the window unit or the door unit and back to the sensor, the sensor can transmit the measured time to the microcontroller unit, and the microcontroller unit can use the measured time to make a security determination.

20 Claims, 1 Drawing Sheet

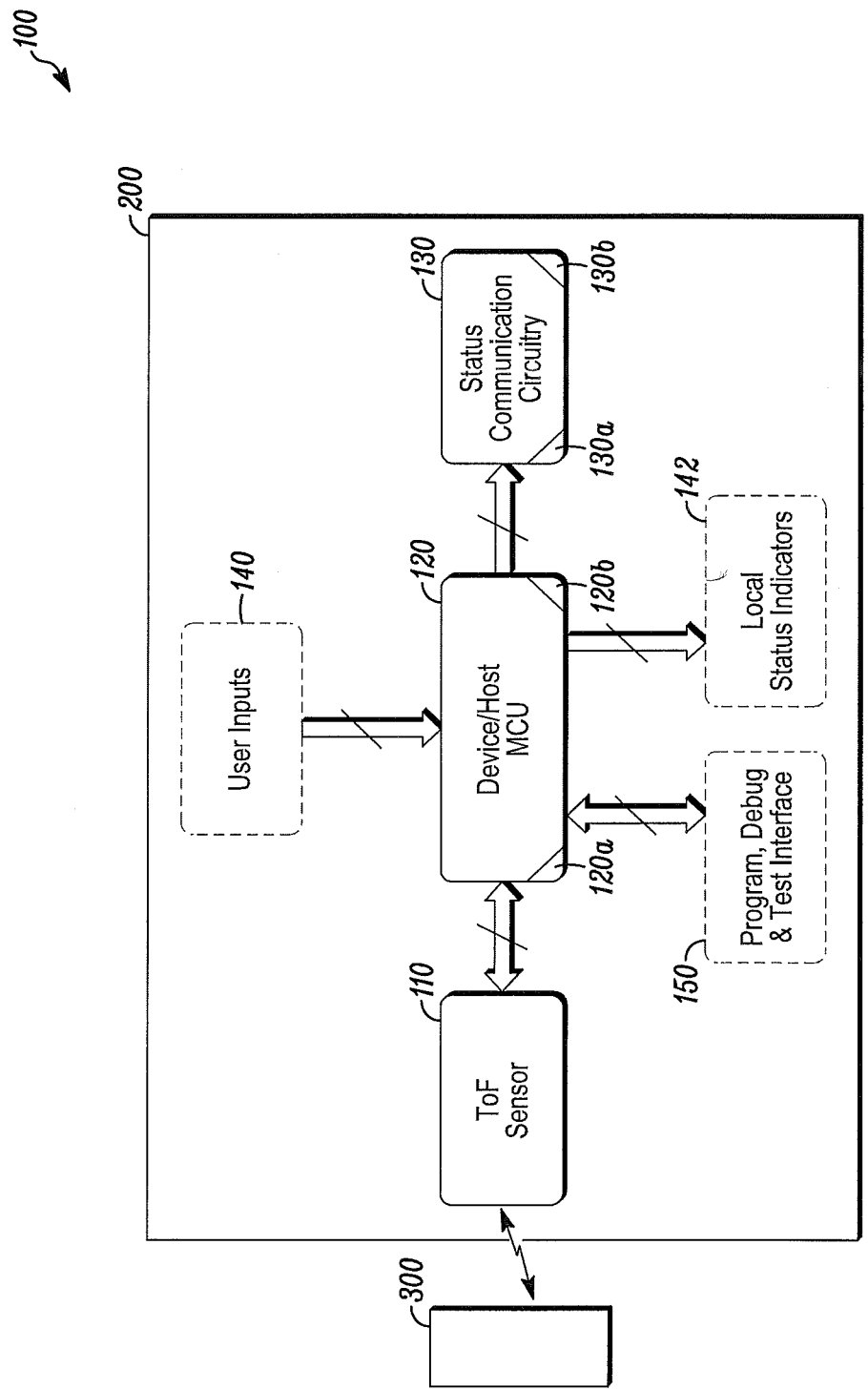

DOOR AND WINDOW CONTACT SYSTEMS AND METHODS THAT INCLUDE TIME OF FLIGHT SENSORS

FIELD

The present invention relates generally to door and window contact systems and methods. More particularly, the present invention relates to door and window contact systems and methods that include time of flight sensors.

BACKGROUND

Known intrusion detection systems can include door and window contact systems and methods that are based on reed and magnet technology. While inexpensive to implement, reed and magnet technology presents at least three significant limitations.

First, in reed and magnet technology, there are limitations on the distance of the gap between the electrical contacts of the reed switch. "Wide-gap" reed switches have had their maximum functional gap stretched to reliable limits through various methods. However, mounting the electrical contacts of the reed switch on surfaces constructed of ferrous metal materials can result in a magnetic flux field interference that reduces the maximum operating gap. To maximize the effective gap, an expensive magnet is required, which is undesirable.

Second, reed and magnet technology is vulnerable to attempts to defeat (AtD) the system by an intruder. For example, the electrical contacts in the reed switch can be defeated by an intruder introducing a magnet in close proximity to the reed. Some systems and methods are known to reduce such security vulnerability, but all incur additional cost, which is undesirable.

Furthermore, in some situations, a user may wish to arm the system while a window(s) is in a partially opened position. However, such a position will likely exceed the maximum functional gap of the electrical contacts of the reed switch. Accordingly, a "bypass" mode can be invoked, but the "bypass" mode can further compromise perimeter intrusion detection, thereby making attempts to defeat by an intruder more likely to be successful.

Finally, when reed and magnet technology is employed, a magnet must be installed in the system. Such an installation further adds to overall cost.

In view of the above, there is a continuing, ongoing need for a system and method to address the gap, security, and robustness limitations of known door and window contact systems and methods without increasing the overall cost thereof.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods that address the gap, security, and robustness limitations of known door and window contact systems and methods without increasing the overall cost thereof. For example, the door and window contact systems and methods disclosed herein can include time of flight (ToF) range sensing technologies, including time of flight sensors. In some embodiments, components of the systems and methods disclosed herein, including the time of flight sensors, can communicate with other system components using wired or wireless technology.

In some embodiments, the systems and methods disclosed herein can include a microcontroller unit or microprocessor that can execute intelligent signal analysis algorithms for detecting relative door or window movement, partial and complete closure events, and/or attempts to defeat. For example, in some embodiments the microcontroller unit can execute a plurality of different signal analysis algorithms and can determine which one of the plurality of algorithms to execute based on received user input. Indeed, in some embodiments, the user input can specify whether a monitored window or door is to be monitored in a closed or a partially opened position, and the microcontroller unit can execute the appropriate signal analysis algorithm based on such input.

A time of flight sensor and/or sensing chip in accordance with disclosed embodiments can be placed in one of a plurality of different locations. For example, in some embodiments, a time of flight sensing chip can be mounted in a window or door recess, for example, in a recessed channel of a window frame or in a recessed channel of a door frame on the side thereof supporting the hinge of a swinging door. In these embodiments, the sensing chip can sense the distance to a moving portion of the window or door. Additionally or alternatively, in some embodiments, a time of flight sensing chip can be mounted on a surface of a door or window, for example, on a moving part thereof, including on a window or a roll-up door. In these embodiments, the sensing chip can sense the distance to a non-moving portion, for example, a window or door frame.

FIG. 1 is a block diagram of a system 100 in accordance with disclosed embodiments. In some embodiments, the system 100 can be embodied in or on a chip and/or in a housing 200.

As seen in FIG. 1, the system 100 can include a time of flight sensor 110, a microcontroller unit 120, control circuitry 130, and a user interface that can include user input mechanisms 140 and user output mechanisms 142, for example, status indicators. In some embodiments, the system 100 can also include an interface 150 for programming, debugging, and testing the microcontroller unit 120.

As seen in FIG. 1, the microcontroller unit 120 can be in communication with the sensor 110, the control circuitry 130, the user input mechanisms 140, the user output mechanisms 142, and/or the interface 150. It is to be understood that some or all of this communication be wired and/or wireless as would be understood by one of ordinary skill in the art.

In some embodiments, the sensor 110 can transmit a signal and measure the time the signal travels from the sensor 110 to a surface 300 and back to the sensor 110. In some embodiments, the surface 300 can include a reflective surface that reflects the signal transmitted by the sensor 110 back to the sensor 110. In some embodiments, the surface 300 can be perpendicular to an optical path of the sensor 110 along which the signal transmitted by the sensor 110 traverses.

In accordance with the above, in some embodiments, the housing 200 and/or the sensor 110 can be mounted in or on a non-moving portion of a window or door, for example, the window or door frame, and the surface 300 can include a moving portion of a window or door, for example, the window or door itself. Additionally or alternatively, in some embodiments, the housing 200 and/or the sensor 100 can be mounted in or on a moving portion of a window or door, for example, the window or door itself, and the surface 300 can include a non-moving portion of a window or door, for example, the window or door frame.

The sensor 110 can transmit a signal to the microcontroller unit 120 with the measured time, and the microcontroller unit 120 can use the received measured time to make a security determination in accordance with disclosed embodiments. For example, in some embodiments, the microcontroller unit 120 can use the received measured time to determine whether the relevant window or door has moved outside of a predetermined range of movement. Additionally or alternatively, in some embodiments, the microcontroller unit 120 can use the received measured time to determine whether the relevant window or door has been completely closed. Additionally or alternatively, in some embodiments, the microcontroller unit 120 can use the received measured time to determine whether an attempt to defeat the system has occurred.

In some embodiments, a user can provide user input to the microcontroller unit 120 via the user input mechanisms 140. For example, in some embodiments, the user input can specify the allowed range of movement for the relevant window or door and/or specify whether the relevant window or door is to be monitored in a closed, open, or partially opened or closed position or state. The microcontroller unit 120 can use the received user input when making a security determination as described above. Additionally or alternatively, the microcontroller unit 120 can use the received user input to determine an appropriate algorithm to execute when analyzing the received measured time to make a security determination as described above.

Based on the results of the security determination, in some embodiments, the microcontroller unit 120 can provide an indication thereof to a user via the user output mechanisms 142. Additionally or alternatively, in some embodiments, the microcontroller unit 120 can transmit an indication of the results of the security determination to a remote or local security system via the control circuitry 130.

It is be understood that the microcontroller unit 120 and/or the control circuitry 130 can include one or more programmable processors 120a, 130a and executable control software 120b, 130b as would be understood by one of ordinary skill in the art. The executable control software 120b, 130b can be stored on a transitory or non-transitory computer readable medium, including, but not limited to, local computer memory, RAM, optical storage media, magnetic storage media, flash memory, and the like. In some embodiments, the executable control software can include the signal analysis algorithms as described above and/or can make the security determinations as described above.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
    a time of flight sensor for mounting in or on a first portion of a window unit or a door unit; and
    a microcontroller unit in communication with the time of flight sensor,
    wherein the time of flight sensor measures a time for a signal to travel from the time of flight sensor to a reflective surface included in or on a second portion of the window unit or the door unit and back to the time of flight sensor,
    wherein the time of flight sensor transmits the time to the microcontroller unit, and
    wherein the microcontroller unit uses the time to make a security determination.

2. The system of claim 1 wherein the first portion of the window unit or the door unit includes a moving portion of the window unit or the door unit, and wherein the second portion of the window unit or the door unit includes a non-moving portion of the window unit or the door unit.

3. The system of claim 2 wherein the moving portion of the window unit or the door unit includes a window or a door, and wherein the non-moving portion of the window unit or the door unit includes a window frame or a door frame.

4. The system of claim 1 wherein the first portion of the window unit or the door unit includes a non-moving portion of the window unit or the door unit, and wherein the second portion of the window unit or the door unit includes a moving portion of the window unit or the door unit.

5. The system of claim 4 wherein the moving portion of the window unit or the door unit includes a window or a door, and wherein the non-moving portion of the window unit or the door unit includes a window frame or a door frame.

6. The system of claim 1 wherein the microcontroller unit using the time to make the security determination includes the microcontroller unit determining whether window unit movement or door unit movement is within a predetermined range of movement, the microcontroller unit determining whether the window unit or the door unit is open, closed, partially open, or partially closed, or the microcontroller unit identifying an attempt to defeat.

7. The system of claim 1 further comprising:
    a user input mechanism in communication with the microcontroller unit,
    wherein the user input mechanism receives user input,
    wherein the user input mechanism transmits the user input to the microcontroller unit, and
    wherein the microcontroller unit uses the user input to make the security determination.

8. The system of claim 7 wherein the microcontroller identifies a signal analysis algorithm to execute based on the user input.

9. The system of claim 7 wherein the microcontroller unit using the time and the user input to make the security determination includes the microcontroller unit determining whether window unit movement or door unit movement is within a predetermined range of movement identified by the user input or the microcontroller unit determining a state of the window unit or the door unit to monitor identified by the user input.

10. The system of claim 1 wherein the time is indicative of a distance between the first portion of the window unit or the door unit and the second portion of the window unit or the door unit.

11. The system of claim 1 further comprising a chip housing the time of flight sensor and the microcontroller unit.

12. A method comprising:
mounting a time of flight sensor in or on a first portion of a window unit or a door unit;
the time of flight sensor measuring a time for a signal to travel from the time of flight sensor to a reflective surface included in or on a second portion of the window unit or the door unit and back to the time of flight sensor;
the time of flight sensor transmitting the time to a microcontroller unit; and
the microcontroller unit using the time to make a security determination.

13. The method of claim 12 wherein the first portion of the window unit or the door unit includes a moving portion of the window unit or the door unit, and wherein the second portion of the window unit or the door unit includes a non-moving portion of the window unit or the door unit.

14. The method of claim 13 wherein the moving portion of the window unit or the door unit includes a window or a door, and wherein the non-moving portion of the window unit or the door unit includes a window frame or a door frame.

15. The method of claim 12 wherein the first portion of the window unit or the door unit includes a non-moving portion of the window unit or the door unit, and wherein the second portion of the window unit or the door unit includes a moving portion of the window unit or the door unit.

16. The method of claim 15 wherein the moving portion of the window unit or the door unit includes a window or a door, and wherein the non-moving portion of the window unit or the door unit includes a window frame or a door frame.

17. The method of claim 12 wherein the microcontroller using the time to make the security determination includes the microcontroller unit determining whether window unit movement or door unit movement is within a predetermined range of movement, the microcontroller unit determining whether the window unit or the door unit is open, closed, partially open, or partially closed, or the microcontroller unit identifying an attempt to defeat.

18. The method of claim 12 further comprising:
a user input mechanism receiving user input;
the user input mechanism transmitting the user input to the microcontroller unit; and
the microcontroller unit using the user input to make the security determination.

19. The method of claim 18 further comprising the microcontroller unit identifying a signal analysis algorithm to execute based on the user input.

20. The method of claim 18 wherein the microcontroller unit using the time and the user input to make the security determination includes the microcontroller unit determining whether window unit movement or door unit movement is within a predetermined range of movement identified by the user input or the microcontroller unit determining a state of the window unit or the door unit to monitor identified by the user input.

* * * * *